United States Patent [19]

Shaw et al.

[11] Patent Number: 5,335,057
[45] Date of Patent: Aug. 2, 1994

[54] MEASURING GEOMETRY OF OPTICAL FIBRE COATINGS WITH TRANSVERSE INCIDENT BEAMS

[75] Inventors: Julia H. Shaw, Romsey; Andrew G. Hallam, Bishops Waltham, both of United Kingdom

[73] Assignee: York Technology Limited, Hampshire, United Kingdom

[21] Appl. No.: 941,418

[22] Filed: Sep. 8, 1992

[30] Foreign Application Priority Data

Sep. 9, 1991 [GB] United Kingdom ............. 9119253.4

[51] Int. Cl.$^5$ .......................................... G01N 21/84
[52] U.S. Cl. .............................................. 356/73.1
[58] Field of Search .............. 356/73.1; 359/387, 639, 359/640

[56] References Cited

U.S. PATENT DOCUMENTS 5,176,731  1/1993  Prast et al. ..................... 356/73.1

FOREIGN PATENT DOCUMENTS 0294889  12/1988  European Pat. Off. .
0443322   8/1991  European Pat. Off. .
3329274   2/1985  Fed. Rep. of Germany ..... 356/73.1
59-91412  5/1984  Japan ............................. 359/640
1395910   5/1975  United Kingdom .
2145852   4/1985  United Kingdom .

OTHER PUBLICATIONS

Search Report for corr. European Application No. EP 92 30 8175.
2418 Soviet Journal of Nondestructive Testing, Nov. 21, 1985, No. 11, N.Y., USA, "Diffraction-Schlieren Image Method of Measuring Hollow Cylindrical Objects" S. D. Mirovitskaya et al.

Primary Examiner—Vincent P. McGraw
Attorney, Agent, or Firm—St. Onge Steward Johnston & Reens

[57] ABSTRACT

An apparatus for measuring the geometry of an optical fibre having at least one coating, the apparatus comprising a container for containing a coated optical fibre in a fluid, means for directing light transversely through the fibre in the container and means for permitting light deviated at the coating interfaces or surfaces to exit the container whereby the light can be detected by a light detecting means by substantially dark field illumination. The invention also provides a method of measuring the geometry of an optical fibre having at least one coating the method comprising the steps of: (a) disposing the coated optical fibre in a fluid; (b) directing incident light transversely through the coated fibre; and (c) detecting transmitted light from the coated fibre which is deviated at the coating interfaces or surfaces so as to detect the coating(s) by substantially dark field illumination.

12 Claims, 1 Drawing Sheet

MEASURING GEOMETRY OF OPTICAL FIBRE COATINGS WITH TRANSVERSE INCIDENT BEAMS

BACKGROUND OF THE INVENTION

The present invention relates to an apparatus for and a method of measuring the geometry of optical fibre coatings.

DESCRIPTION OF THE PRIOR ART

Optical fibres used in the transmission of data normally have one or more plastics coatings applied along their length during the manufacturing process. The coatings are required for three reasons:—mechanical strength, protection from external agents, and the removal of light present near to the fibre edge which can interact with the information carrying light which travels in the central region of the fibre. A knowledge of the thickness and concentricity of the coatings applied is important in assessing the performance of optical fibres.

In the prior art it is known to measure the geometry of optical fibre coatings by placing the fibre to be measured in a small container, or cell, consisting of parallel front and rear surfaces, or windows, which are made of a transparent material. The cell is filled with a transparent fluid having a refractive index similar to, but not the same as, the refractive index of the outermost coating of the fibre. The fibre is illuminated through the rear window and is observed through the front window. The presence of the immersion fluid enables the interfaces between the coatings and the interface with the glass fibre itself to be seen. The distances between the layers are then measured using an optical microscope and by performing measurements at a series of different angular positions of the fibre, the coating diameters, non-circularities, and concentricities can be determined.

The main disadvantage with this known method is that the image of the interfaces is neither sharp nor of high contrast. Thus locating their positions is difficult and this leads to poor measurement repeatability.

The present invention aims at least partially to overcome or alleviate these disadvantages.

SUMMARY OF THE INVENTION

Accordingly, the present invention provides an apparatus for measuring the geometry of an optical fibre having at least one coating, the apparatus comprising a container for containing a coated optical fibre in a fluid, means for directing light transversely through the fibre in the container and means for permitting light deviated at the coating interfaces or surfaces to exit the container whereby the light can be detected by a light detecting means by substantially dark field illumination.

Preferably, the light directing means comprises a prism for directing light onto the fibre. More preferably, the prism comprises a rectangular block, having a rectangular end surface which is near or adjacent to the container through which light is directed onto the fibre, and an opposed bevelled end which, in use receives collimated light along the axis of the rectangular block.

The bevelled end may comprise two mutually inclined bevelled surfaces which coincide at the axis of the rectangular block.

The apparatus may further comprise a collimator for directing collimated light onto the bevelled end of the prism. The collimator preferably comprises a lens.

The apparatus may further comprise a light source including an optical fibre which is adapted to direct light onto the collimator.

In the preferred embodiment, the container, the prism, the collimator and the light source are supported in line in a common housing.

The present invention also provides a method of measuring the geometry of an optical fibre having at least one coating, the method comprising the steps of:
 a) disposing the coated optical fibre in a fluid;
 b) directing incident light transversely through the coated fibre; and
 c) detecting transmitted light from the coated fibre which is deviated at the coating interfaces or surfaces so as to detect the coating(s) by substantially dark field illumination.

Preferably, the incident light is refracted light which is directed through the coated fibre from a prism.

More preferably, the incident light is split into two light paths by the prism and the two light paths cross at a location at which the fibre is disposed.

Preferably, collimated incident light is incident on the prism, and the two light paths are each reflected at respective prism surfaces whereby the two light paths substantially cross at a location inside the prism.

Preferably, at least one of the thickness and uniformity of the at least one coating are detected by substantially dark field illumination.

BRIEF DESCRIPTION OF THE DRAWINGS

An embodiment of the present invention will now be described by way of example only with reference to the accompanying drawings, in which.

DETAILED DESCRIPTION OF THE PREFERRED EMBODIMENTS

Figure 1:
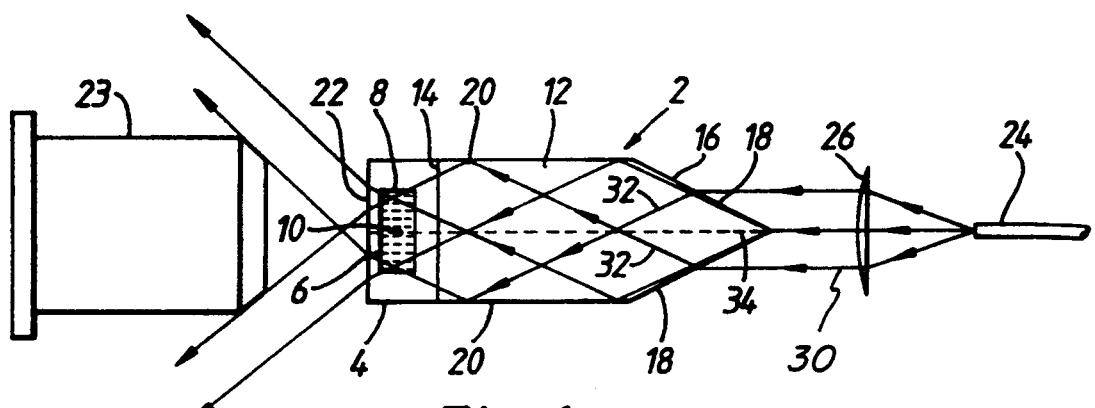
FIG. 1 is a schematic plan view of an apparatus for measuring geometry of optical fibre coatings in accordance with the present invention.
Figure 2:
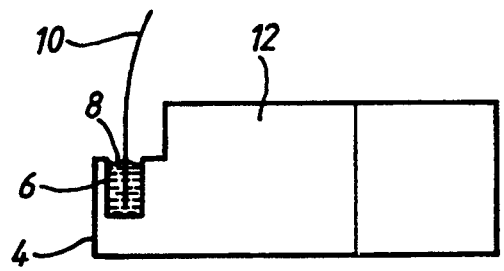
FIG. 2 is a sectional side view of the prism and container assembly of the apparatus of FIG. 1.
Figure 3:
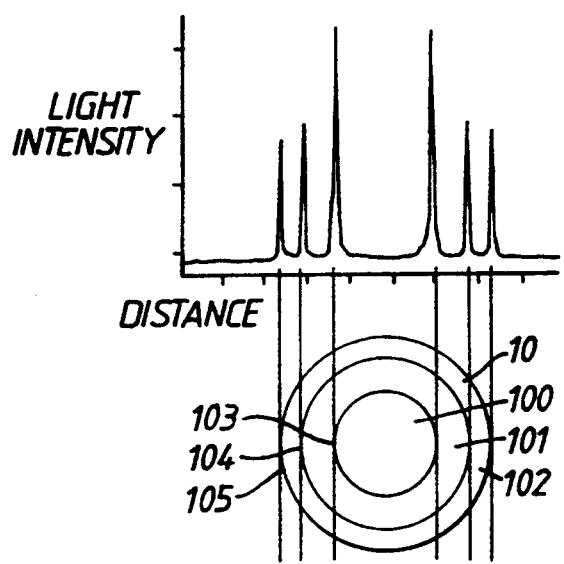
FIG. 3 shows the relationship between the structure of the optical fibre and the coatings thereon and an image printout which is obtainable in accordance with the method of the present invention to measure the geometry of the optical fibre coating.

Referring to FIGS. 1 and 2, an apparatus 2 for measuring the geometry of optical fibre coatings includes a container 4 defining a reservoir 6 for receiving a fluid, typically a liquid having a refractive index similar to, but not the same as, the refractive index of the outermost coating of the fibre to be tested. In use, an optical fibre 10 having one or more coatings to be tested is supported in the container by support means (not shown) so that the fibre 10 is disposed vertically in an immersion fluid 8 at substantially the centre of the container 4. A typical fibre 10 to be tested is shown in FIG. 3, the fibre 10 having a central cylindrical core 100, a first inner annular coating 101 and a second outer annular coating 102. The thickness and uniformity of each coating 101, 102 can be measured in accordance with the present invention. In the illustrated embodiment, the container comprises a block of transparent material, for example glass or plastics. A prism 12 is integral with the container 4 and is correspondingly composed of transparent plastics or glass. The prism 12 has an end wall 14 which is planar and abuts the container 4 and the opposed end of the prism 12 consists of a bevel 16 comprised of a pair of mutually inclined bevelled surfaces 18. Typically, the angle of inclination between the inclined surfaces 18 is from 50 to 60°. The prism 12, apart from the bevelled end 16, is preferably rectangular and has a square cross-section. The prism 12 has a pair of opposed parallel side faces 20 and at the light output end of the prism 12/container 4 assembly is a light output face 22. An illumination source 24, comprising a remotely illuminated optical fibre and a collimator 16 comprising a lens are located near to the bevelled end 16 of the prism 12. A microscope objective 23 is located near to the light output face 22. The numerical aperture of the microscope objective 23 is typically around 0.4. In FIG. 1 the various components are illustrated as being separate but it will be apparent to the man skilled in the art that it would be possible for the illumination source 24, the collimator 26 and the prism 12 to be mounted in 8 common housing, thereby facilitating optical alignment.

In use, the light from the illumination source 24 is collimated by the collimator 26 and is incident on the bevelled end 16 of the prism 12. The incident parallel light 30 is split into two halves by the bevel so as to have two light paths 32 of substantially equal intensity, with each hall of the incident light being refracted by a respective bevelled face 18. The two light paths 32 are subsequently reflected inside the prism 12 at the side faces 20. In the illustrated embodiment, the reflection is achieved by the phenomenon of total internal reflection but in an alternative embodiment a reflective layer (not shown) may he applied to the side faces 20 if this is required dispensing on the optical characteristics of the prism. After each reflection the two light paths 32, each being of substantially collimated light, then cross each other at a location on the optical axis 34 of the prism 12, at which location the optical fibre 10 under test is positioned in the container 4. The two light paths 32 then separate and exit the prism 12 through the light output face 22. The microscope objective 23 is employed to form an image of the optical fibre 10 which may be viewed directly or alternatively recorded electronically for computer analysis.

The method end apparatus of the present invention employ the technique of dark field illumination so as to produce an image of the coating interfaces which is both sharp and of high contrast. A typical image is illustrated in FIG. 3. Since there is substantially dark field illumination of the optical fibre, the light being focused onto the reservoir 6 containing the immersion fluid 8 and the optical fibre 10, the light is directed at an angle to the optical axis of both the prism 12 and the microscope aperture. The two light paths are incident on the microscope objective 23 at an angle to the optical axis of the microscope objective 23 so that the light does not enter the microscope aperture to form an image unless the light has been deviated by the coated optical fibre. At the location where the optical fibre is present in the reservoir, the light paths are deviated at the coating interfaces 103, 104 as a result of differences in refractive index between the coating(s) 101, 102 end the central fibre 100 and at the outer coating surface 105 as a result of a difference in refractive index between the coating 102 and the fluid such that the deviated light can enter the microscope aperture and enable an image to be seen. Each image represents the position of an interface 103, 104 or surface 105 of a coating layer 101, 102. The regions between the interfaces 103, 104 or outside the surface 105 however remain dark. This enables a high contrast image consisting of bright peaks corresponding to the interfaces and outer surface to be formed. Such an image is illustrated in FIG. 3, in which the peaks are shown corresponding to the interfaces 103, 104 and the surface 105 of the optical fibre 10 under test. The distances between the peaks can be measured either directly, for example mechanically by a measuring device incorporated in the microscope objective, or electronically so as to enable an accurate geometric measurement of the optical fibre coatings to be effected.

WHAT IS CLAIMED IS

1. An apparatus for measuring the geometry of an optical fibre having at least one coating, the apparatus comprising a container for containing a coated optical fibre in a fluid, a prism for directing light transversely through the fibre in the container, the prism being adapted to split light incident thereon into two light paths and to reflect the two light paths at respective prism surfaces whereby the two reflected light paths cross at a location in the container at which the fibre is, in use, disposed, and light exit means for permitting light deviated at the coating interfaces or surfaces to exit the container whereby the light can be detected by a light detecting means by substantially dark field illumination.

2. An apparatus according to claim 1 wherein the prism comprises a rectangular block, having a rectangular end surface which is near or adjacent to the container through which light is directed onto the fibre, and an opposed bevelled end which, in use, receives collimated light along an axis of the rectangular block.

3. An apparatus according to claim 2 wherein the bevelled end comprises two mutually inclined bevelled surfaces which coincide at the axis of the rectangular block.

4. An apparatus according to claim 2 wherein the apparatus further comprises a collimator for directing collimated light onto the bevelled end of the prism.

5. An apparatus according to claim 4 wherein the collimator comprises a lens.

6. An apparatus according to claim 4 wherein the apparatus further comprises a light source including an optical fibre which is adapted to direct light onto the collimator.

7. An apparatus according to claim 6 wherein the container, the prism, the collimator and the light source are supported in line in a common housing.

8. A method of measuring the geometry of an optical fibre having at least one coating, the method comprising the steps of:
   a) disposing the coated optical fibre in a fluid;
   b) directing incident light transversely through the coated fibre, the incident light comprising two light paths which have been formed by refraction of collimated light by a prism and have been reflected at respective prism surfaces so as to cross at a location at which the fibre is disposed; and
   c) detecting transmitted light from the coated fibre which is deviated at coating interfaces or surfaces so as to detect the at least one coating by substantially dark field illumination.

9. A method according to claim 8 wherein the two light paths substantially cross at a location inside the prism.

10. A method according to claim 9 wherein at least one of the thickness and uniformity of the at least one coating are detected by substantially dark field illumination.

11. A method according to claim 9 wherein at least one of the thickness and uniformity of the at least one coating are detected by substantially dark field illumination.

12. An apparatus for measuring the geometry of an optical fibre having at least one coating, the apparatus comprising a container for containing a coated optical fibre in a fluid, a prism for directing a pair of beams of collimated light transversely through the fibre in the container, the prism comprising a rectangular block having a rectangular end surface which is near or adjacent to the container through which light is directed on the fibre, and an opposed bevelled end which, in use, receives collimated light along an axis of the rectangular block, a collimator for directing collimated light on to the prism, a light exit for permitting light deviated at the coating interfaces or surfaces to exit the container and a light detector for detecting the deviated light whereby at least one of the thickness and uniformity of the at least one coating can be measured by substantially dark field illumination.

* * * * *